United States Patent [19]

Pallmann

[11] 3,941,319

[45] Mar. 2, 1976

[54] CUTTER RING HAVING DETACHABLE CUTTER PACKETS

[75] Inventor: Wilhelm Pallmann, Zweibrucken, Germany

[73] Assignee: Pallmann KG. Maschinenfabrik, Zweibrucken, Germany

[22] Filed: July 5, 1974

[21] Appl. No.: 486,175

[30] Foreign Application Priority Data

July 5, 1973 Germany ........................... 2334151

[52] U.S. Cl. ............... 241/290; 83/699; 144/162 R; 144/312; 144/326 R; 241/292.1

[51] Int. Cl.[2] ......................................... B02C 17/10

[58] Field of Search ............ 241/292.1, 191, 188 A, 241/290; 83/698, 700, 699; 144/212, 162 R, 172, 163, 176, 312, 326 R, 326 A, 326 B, 326 C, 326 D, 164, 174

[56] References Cited

UNITED STATES PATENTS

| | | | |
|---|---|---|---|
| 250,125 | 11/1881 | Bennett | 241/188 A |
| 3,659,793 | 5/1972 | Stephenson et al. | 241/187 |
| 3,817,460 | 6/1974 | Alpha | 241/191 X |

*Primary Examiner*—J. M. Meister
*Assistant Examiner*—W. D. Bray
*Attorney, Agent, or Firm*—Walter Becker

[57] ABSTRACT

A cutting device having concentric counter-rotating cutter rings thereon with the outer ring having end members with support members extending axially therebetween. Cutter packets are detachably mounted on the radially outer side of said support members and are clamped in place by spring biased clamping bars. The housing of the device includes motor operated lift members engageable with said bars singly in respective rotated positions of said outer ring for unclamping said packets for replacement. Each packet has a support plate and a cutter blade adjustably connected thereto.

15 Claims, 6 Drawing Figures

CUTTER RING HAVING DETACHABLE CUTTER PACKETS

The present invention relates to a further development of chip-removing machines with cutter rings which machines were previously designated as cutter basket chip-removing machines, and relates in particular to wood-cutting machines. With cutter ring chip-removing machines, especially with wood-cutting machines, it is necessary during a continuous operation, approximately every 4 hours to replace the dual cutters or blades by new ground cutters or blades. In such an instance, not only the cutters alone but also the cutter cover and holding plate in the form of cutter packets have to be exchanged as an entirety. With relatively small cutting machines as they were used previously, the entire cutter basket or segments of the machine was together with the built-in cutter packets exchanged because this could be carried out conveniently in view of the relatively low weight. In addition thereto, a second cutter packet or second segments had to be available all the time.

With modern larger type of cutting machines, only the cutter packets of the respective cutter ring were exchanged. The cutter packets consist of the knife plate or holding plate and the cutting knife adjustably fastened on the underside of this plate. The knife cover plates are often provided with a frequently centrally arranged handle. The cutter rings of these types and also those according to the present invention include a carrier disc which is nonrotatably mounted on a rotatable shaft, and furthermore includes a carrier ring. Said carrier disc and carrier ring are firmly interconnected by numerous cutter carriers.

With these and similar design types, cutter packets are, in order to be able to withstand the cutting pressure of the cutters, firmly pressed upon the carrier segments and are simultaneously fixed in their respective proper position by means of threaded stay bolts inserted into said segments, including the pertaining cap nuts which exert the pressure. During the exchange of the cutter packets, the cap nuts are loosened by means of manually operated or mechanically operated wrenches. After the installation of a new cutter packet, the cutter packet is again fastened in a corresponding manner. The time employed for such exchange is unfavorable when the exchange is effected manually and is more favorable when mechanically operated wrenches are employed. However, both methods have the drawback that the life span of the stay bolts-cap nut units, which have to withstand the cutting pressure, is not satisfactory. With mechanical screwing devices there exists the additional disadvantage that the cost therefor and the maintenance costs are rather high for an economic operation, even if such screwing device can by means of rails be used for a plurality of cutting machines.

This method on the other hand has the advantage that the cutting packets during the exchange can be removed in upward or outward direction which means perpendicularly with respect to the cutter carriers, after the cap nuts have been loosened or when inserting the same in reverse direction can easily be placed in their proper place. The entire operation is effected through a small lateral housing cover which is then opened and can easily be checked by the operator. Interfering soiling can easily be removed by the operator from the cutter carrying segment. With this type of cutter exchange, the large housing cover in the front of the cutting machine neet not be opened and it is not necessary partially to loosen the material inlet connection.

These favorable properties will, as will be set forth further below, be increased in the arrangement according to the present invention but not the rather unfavorable features that the cutter packets when being screwed on are pressed against their carrier segments. The life span of the screw mechanism is as mentioned above not favorable, nor are the following features.

The screwing-on of the cutter packets requires longitudinal grooves for the passage of the above mentioned threaded stay bolts which longitudinal grooves are arranged perpendicularly with regard to the cutting edge of the cutters. It is necessary that longitudinal grooves are provided in order to make possible that the cutter packets can be adjusted perpendicularly to the cutter edge for the correct cutting width. In view of these longitudinal grooves, the cutters will for post-grinding have only a small width of material left. This is due to the fact that the width of the cutters as function of the respective cutter ring is limited. This width of material which extends from the cutting edge of the cutters to the start of its longitudinal grooves amounts with heretofore known designs to frequently not more than 10 millimeters. A frequent post-grinding of the cutter and thus a long life of the cutter which contsists of high grade steel can in this instance not be assured.

It is for this reason that further cutter ring cutting machines have been designed according to which the cutter packets are not screwed to their cutter supporting segment but are firmly pressed into working position against the cutter supporting segment or for instance are clamped thereagainst. The cutter packets, and as the case may be, also the cutters, are in most instances slidably arranged in grooves of cutter carrier segments, in the longitudinal direction which means parallel to the direction of the cutter axis, and can only in this longitudinal direction be pulled out forwardly when the large housing cover is open or can for instance by compressed air controlled pressure push rods from the rear be ejected toward the front or at least be placed under air pressure. The necessary pressing pressures are transmitted by longitudinally movable clamping bars partially of wedge-shaped form or by clamping tongues or by intermediate members which are partially wedge-shaped and are controlled by said clamping bars or clamping tongues.

The above solutions, especially if they involve automatic machinery, require many parts and are liable to considerable soiling. The cutters and cutter packet seats have prior to the reinstallation of the cutters to be cleaned carefully preferably with compressed air.

It is, therefore, an object of the present invention to provide a cutting machine with cutter ring which will make it possible easily and under good observation to remove in upward direction the cutter packets to be exchanged after loosening of a simple pressing device and without the necessity of post-checking to insert newly adjusted packets in the opposite direction while making sure that the cutters and cutter packets are inserted in a precise manner.

In connection herewith, it is also an object of the present invention so to design the above outlined machine that the parts of the cutter packet pressing device will be simple and can be installed so that they will not be soiled while the design of the cutter packets and the cutters is such that the cutters will have more than half of their width available for post-grinding.

These and other objects and advantages of the invention will appear more clearly from the following specification in connection with the accompanying drawings, in which.

Figure 1:
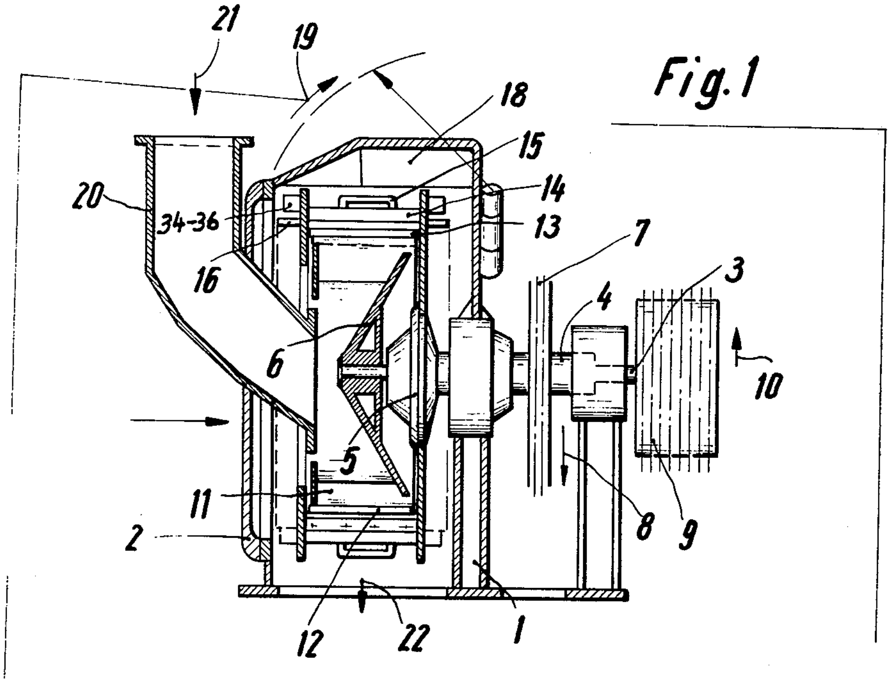
FIG. 1 shows a cutter ring cutting machine in axial section, said section being taken along the line I — I of FIG. 2.

The cutter ring for cutting machines according to the present invention, is characterized primarily in that for each cutter carrying segment there is provided a pressure strip which is adapted to be lifted vertically with regard to its adjacent plate, said pressure strip being operable to exert a pressure upon a cutter packet which is placed from above upon the cutter carrying segment.

More specifically, the cutter packets which have previously been set in conformity with their necessary width are, when occupying their position of operation from above, firmly pressed against the receiving surface of the pertaining cutter carrying segments which is provided with small laterally inserted fixed adjustment plates or fitting members, and this pressing operation is carried out by a strong pressure strip or pressure rail pressing device. Each pressing strip conveys the pressure upon the cutter packets while engaging the same over the entire length in a manner to prevent the entering of dust.

The pressure strips are so designed that their extended ends pass through bushings which on one hand are inserted into the carrier disc and on the other hand are inserted in the carrier ring. These bushings are provided with oblong holes to permit a lifting of the pressure strips and thereby a release of their pressure. On the outside of the carrier disc and of the carrier ring, there is for each pressure strip fixedly arranged a dish spring unit with a housing. The housings are respectively surrounded in a dust-tight manner by a dish spring set which conveys its pressure through a central pressure push rod in working position upon the corresponding free end of the pressure rail to which it is firmly connected.

For a cutter exchange which is carried out in a certain cutter ring position, the cutter housing has a lateral small housing cover which is adapted to be opened to such an extent as to permit a cutter exchange. The respective cutter carrying segment which carries the cutter packet to be exchanged is to be adjusted for the said necessary opening. This setting or adjustment is effected by locking engagement of the cutter ring which is manually turned to the respective position. On the outside of the large front housing cover and on the outside of the cutter housing is in the direction of the driving discs furthermore firmly arranged a cutter lifter with its housing which in its turn is coupled to an adjusting cylinder. Each of the two cutter lifters has an abutment element which is fixedly connected to its piston and points to the center of the cutter ring. One of said two abutment elements or members extends through a groove in the large housing cover and the other abutment member extends through a corresponding groove in the housing wall opposite the cover to such an extent that both abutment members will in response to a movement of the lifter piston in upward direction press from below in the direction upon the dish spring units against the free ends of the pressure bar of the engaged or latched supporting segment. In this way, the pressure bar is lifted and the entire cutter packet made free of cup spring engagement pressure can be exchanged.

The operation during the cutter exchange of a correspondingly already latched or engaged cutter ring and of the already opened lateral housing cover is therefore effected as follows: The respective front cutter packet is not yet clamped in by its pressure strip. The pressure of the two dish spring packets safely exceeds the effect of the cutting pressure of the cutter during operation of the latter.

By means of actuating a knob-operable double throw switch arranged on the cutter on the cutting machine, a simple pump unit is switched on. The lower portion of the adjusting cylinders on both sides will then through a fractional feeding line each be subjected to such a pressure that its adjusting pistons together with the coupled-on lifting piston move upwardly and with the latter also the abutment pieces firmly connected thereto. The conveyed pump pressure is so high that through the invention of the abutment members abutting against the free ends of the pertaining pressure strip, the counter pressure of the two dish spring packets is overcome and the pressure strip is lifted. The operator will thus be able easily to lift out the front cutter packet and to insert a replacement packet. A second pressure upon said double throw switch will suffice in order through a second pressure line to change the movement of the adjusting and lifter pistons and thereby to change the position of the abutment members, in other words, to move the same into the opposite direction. Thus, the dish springs will again become fully effective and the pressure strip will press the new cutter packet into operative position. The cutter ring will subsequently be turned manually to the next arresting or latching notch corresponding to the next carrier segment, and the next cutter packet will be exchanged. This operation is repeated until a complete cutter set is exchanged in this simple manner.

It will be appreciated that the present invention results in a simple cutter packet and in a cutter which can be ground again and again over a considerable period of time. The previously customary longitudinal slots for the threaded connecting bolts of the cutter packet onto the knife-ring support or carrying segments are no longer needed. In view of the pressing device according to the invention, it is now possible to design the cutters and cutter cover plate in the form of simple substantially plane parallel plates which are interconnected in a normal manner by means of socket head cap screws.

The heads of the screws slide in covered condition in customary manner in sliding slots of the cover plates.

However, for purposes of realizing a maximum post-grinding possibility along at least two parallel lines extending perpendicularly with regard to the cutting edge of the cutter, a cutter now has two threaded bores arranged in spaced relationship to each other for the insertion of the above mentioned socket head cap screws. The bores are located close to the upper longitudinal edge of the cutter so that in view of the great width of the cutter obtained in view of the pressing device, a very great post-grinding possibility and thus a long use of the cutter is realized. The post-grinding possibility equals the length of the adjusting possibility of the socket head cap screws in the sliding slots of the cutter plates increased by the distance of the two threaded bores each in the cutter. The cutter may by this distance be offset relative to its cover plate. In actual practice, it has been found that the arrangement according to the present invention yields a post-grinding possibility of 62 millimeters with a cutter having a width of about 100 millimeters.

Figure 2:
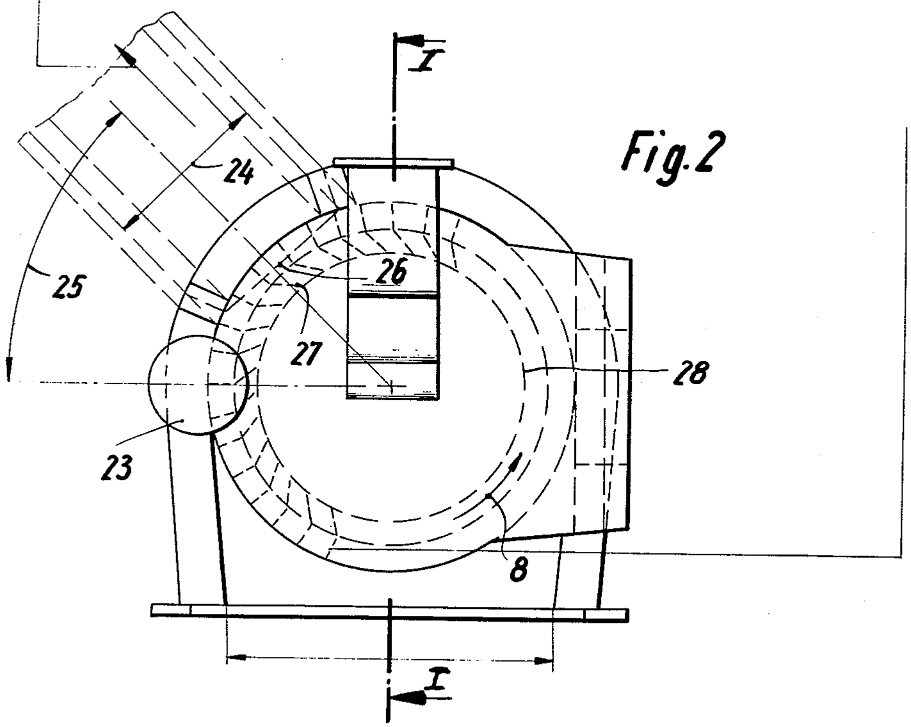
FIG. 2 is a front view of the cutting machine of FIG. 1 with the cutter ring diagrammatically sketched in and with a lateral housing cover adapted to be opened up for the exchange of the cutters.

Referring now to the drawings in detail, the FIG. 1 shows in a section along line I—I in FIG. 2 arrangement comprising a housing 1 with a large housing cover 2. Journaled in said housing 1 is a main shaft 3 journalled partially by means of a hollow shaft 4 extending over the main shaft 3. The shaft 4 is frictionally connected to a cutter ring 5. Keyed to the main shaft 3 is a driving pulley 9. The cutter ring 5 together with the hollow shaft 4 are rotatably arranged and only in specific instances are driven by a sprocket wheel 7 in clockwise direction indicated by the arrow 8. The impeller 6, together with the main shaft 3 are when in operation driven by the V-belt pulley 9 in the direction of the arrow 10 which means in counterclockwise direction. The impeller vanes 11 are equipped with impeller strips 12 which are located opposite the cutters 13 of the cutter ring. The pressure plate 14 of the cutter and pressing device (shown in detail in FIG. 3) covers the cutter holding plate of a cutter packet, only the handle 15 of plate 46 being visible. The pressure plate 14 presses the knife packet agains the cutter ring 5 but can be lifted (FIG. 3) to protrude with its free ends 16 on both sides from the cutter ring 5. The free ends 1 are engaged by the cup springs or dish spring pressure units 34, 36.

In order to be able to carry out a cutter packet exchange, the housing 1 is equipped with an upper lateral housing cover 18 which can be opened in the direction 19. The material to be cut is fed through the inlet connection 20 in the direction 21. This material slides toward the impeller 6, the vanes 11 of which drive the material from the inside toward the cutter ring 5 as evident from FIG. 3. The material chipped or cut by the blades 13 is in operation of the device by the mill air flow obtained by the impeller 6 expelled through the gaps between the cutter carrier segments of the cutter ring 5 into the free width of the housing 1 and further in the direction 22 downwardly.

Figure 3:
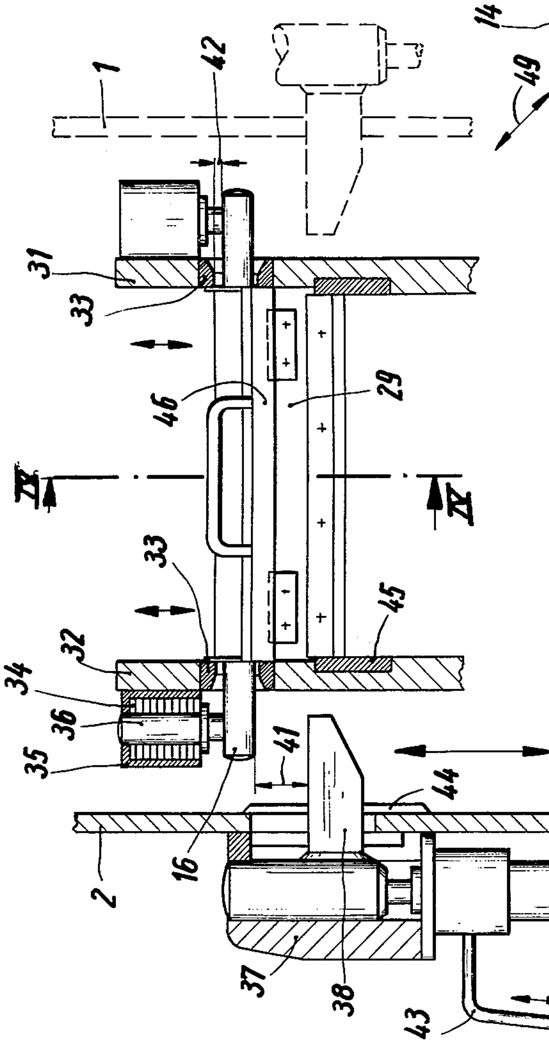
FIG. 3 shows a diagrammatic longitudinal section through cutter carrying segments with parts of the pressing device.
Figure 6:
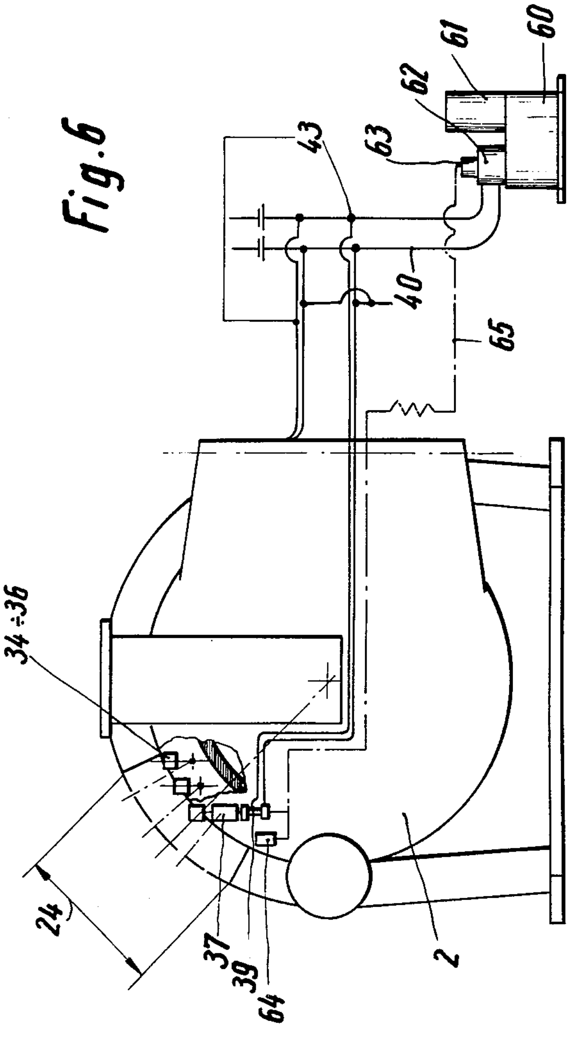
FIG. 6 illustrates a view of a cutting machine with a cutting ring and also diagrammatically illustrates the control mechanism for the pressing device.

FIG. 2 shows a front view of the cutter ring comprising cutting device. A rotatably and pivotally arranged hand wheel 23 keeps the housing cover 2 closed during operation and during a cutter exchange. FIG. 1 shows at the upper portion thereof the housing cover 18 which is adapted to be opened and which opens toward the rear in the direction 19 whereby for purposes of a cutter exchange a working chamber of a maximum free width 24 is exposed. The center line of this free width 24 as shown in FIG. 2 expediently forms with the horizontal an angle 25 of 45°. As FIG. 6 illustrates, this brings about that the cutter lifters 37 indicated in FIG. 3 press the pressure strips 14 (FIG. 1) (vertically upwardly from the respective cutter packet 27 to be exchanged whereby the cutter packet 27 will be free for removal and for replacement by another cutter packet. The cutter ring itself is shown only schematically in FIG. 2 in dash lines with a clear width 28 and a central somewhat greater diameter in conformity with the outer edges of the cutter holding plates which means where the handles 15 are connected. This means with an outer diameter which is in conformity with approximately the outer edges of the handles, respectively equal to the outer diameter of the cutter ring-carrier disc or plate and the cutter ring carrier ring as illustrated. In the cutter ring itself there is noted that the cutter ring carrier segments are arranged only in the through passage gap for the generated flakes or chips of passage material continuously separate from each other (Compare in FIG. 4 the illustration of a cross sectional drawing of such a segment as the cutter ring carrier segment). FIG. 3 shows a diagrammatic cross section through an upper, i.e., circumferentially outer cutter ring part with built-in cutter carrier segment 29 (See FIG. 4, arrow 30), a cutter ring supporting disc 31 and a cutter ring-carrier ring 32, both with one inserted bushing 33 each having an oblong hole. The pressure strip 14 extends through said hole with both ends 16 at both sides. The dish spring units 34 which are installed in a dust-tight manner in their housing 35 exert through bolts 36 the common dish or cup spring pressure.

In this connection it may be mentioned that the outer circumference (not shown) of the cutter ring - carrier disc is for each cutter carrier segment provided with a latching or engaging notch into which the respective segment with its cutter packet to be exchanged is inserted into the cutter exchange FIGS. 1 and 2 position and in this position is latched.

According to the above, a complete cutter lifter 37 with abutment member 38 and built on double-acting adjusting cylinder 39 are arranged on the outer wall of the housing cover 2 and correspondingly on the outer side of the housing wall 1.

If now a pump unit will through the intervention of a double throw switch (FIG. 6) convey pressure through feeding line 40 for a cutter packet exchange, the piston of the adjusting cylinder 39 presses the piston of the cutter lifter 37 with its abutment member 38 upwardly. This operation and a further operation are effected on both sides toward the cutter ring as is indicated on the right hand side by an abutment member 38 (FIG. 3).

After the greater stroke 41 has been effected, the abutment members 34 abut the free ends 16 of the pressure strip which up to that time has pressed on the respective cutter packet and through the intervention of the pressure strip pressed the dish spring units 34 together in upward direction by the smaller stroke 42.

In this way the cutter packet with its cover plate is free of pressure and can now by one hand operation easily be removed, and a new fixed-up packet can as easily be inserted.

After the insertion has been effected, the pressure from the conduit 40 is relieved through the intervention of the above mentioned double-throw switch of the pump unit and is conveyed to the conduit 43. The pistons of the adjusting cylinder 39 and of the lifter 37 move downwardly. The ends 16 of the pressure strip through the newly inserted cutter packet and under the effect of the dish spring units 34 press now the newly inserted packets firmly against the pertaining cutter carrier segment.

It may be mentioned that the passages provided in the housing wall 1 and the housing cover 2 respectively which are intended for the pressure strip ends 16 of the abutment members 38 are provided or covered with sliding discs 44 (partially not shown). Similar remarks apply to the pressure strip ends 16 with regard to their passages through the bushings 33 with oblong holes inserted in the carrier ring 32 and the carrier disc 31. Wear resistant rings 45 are provided on the inner side of the carrier disc 31 and carrier ring respectively, said wear resistant rings considerably reduce the wear laterally on the cutter gap.

Figure 4:
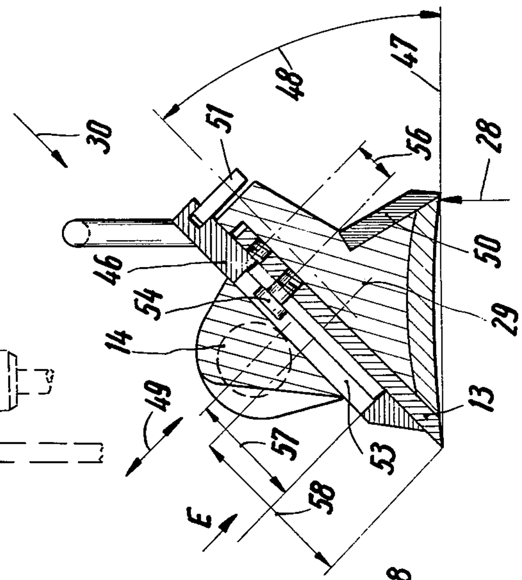
FIG. 4 shows a cutter carrying segment in a transverse section taken along the line IV — IV of FIG. 3, and also shows a cutter packet pressed on by a pressure strip or pressure rail.

FIG. 4 shows a cross section through a cutter carrying segment 29. According to this arrangement, a cutter packet composed of the cutter 13 and a cutter cover plate 46 is by means of a pressure strip 14 firmly pressed against the carrier segment. The cutter 13 is in this arrangement inclined by an angle 48 of 45° relative to the base line 47 of the segment which corresponds to the diameter of the clear width 28 of the segment so that according to FIG. 2 (26 and 27) a loosening pressure of the cutter packets (13 plus 46) is, with the pressing device according to the invention, effected in the direction of the arrow 49 which means perpendicularly with regard to the cutter packet engaging surface on the carrier segment 29, and thus vertically upwardly. This greatly facilitates a correct mounting of the lifting cylinder of the pressing device whereby occasionally check-ups of a corresponding proper seat are materially facilitated.

The carrier segments are furthermore equipped with wear resistant pressure lips 50 for limiting the chip passing gap together with the edge of the cutter and further fitting plates 51. These plates 51 serve for a precise locating of the cutter packets because the cutter cover plates extend with a corresponding groove in installing condition over the fitting surface.

Figure 5:
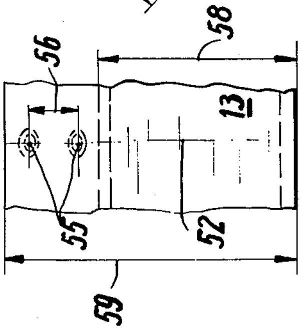
FIG. 5 represents a view of a cutout of a cutter to illustrate the great possibility available for post-grinding of the cutter, said view being seen in the direction of the arrow E of FIG. 5.

FIG. 5 illustrates the great post-grinding possibility of the cutters and illustrates a view of the cutter part seen in the direction of the arrow E (FIG. 4). FIG. 5 thus shows the cutter seen from above. In view of the pressing device according to the invention and the thus possible elimination of the otherwise necessary threaded bolt units which are used for screwing on the cutter packets and which will also require longitudinal guiding slots in the cutter packets, the wearing width of the cutters is rather large.

Furthermore, in the line 52 which coincides with the center line of the longitudinal slots 53 in the cutter holding plates, the cutters are provided with two threaded bores each. Into one of these bores one of the cylindrical tap screws 54 is to be screwed which aids in the firm connection of the respective cutter with its cover plate and is guided in one of the longitudinal slots 53 of the cover plate. Such a screw may be displaced in its longitudinal slot and may from the inner threaded bore in the pertaining cutter be transferred into the outer bore close to the edge of the cutter which corresponds to the distance 56 representing the distance of the two threaded bores from each other. Both distances 56 and 57 together make out the distance 58 which is identical to the large post-grinding possibility of the cutters. Already with regard to the pressing device, the cutter width may be selected rather wide for instance with a width of 100 mm. so that a cutter post-grinding possibility for the distance 58 is obtained for instance to the extent of 62 mm.

FIG. 6 shows the overall diagram of a cutter exchange. A pump unit furnishes the necessary water under pressure. The unit comprises a fluid container 60 on which the necessary pump with its driving motor 61 is mounted. Furthermore mounted on said container 60 is a branch pipe 62 for two connecting pressure pipelines 40 and 43 (FIG. 3). The respective inflow to one of the two conduits and the simultaneous outflow from the other conduit is controlled by the distributing member 62, the latter being controlled by a switch 63.

Switch 63 receives its pulses by means of a double-throw switch 64 through an electric connecting line 65, said switch 64 being fitted on the housing cover 2.

The cutter ring cutting device is shown in FIG. 6 in view only diagrammatically. The lateral housing cover which frees the working chamber for a cutter exchange with the clear width 24 according to FIG. 2, is not illustrated. For further clarification, a portion of the large housing cover on the exchange spot is shown cut open so that some of the dish spring units 34–36 are shown which by means of pressure strips press the cutter packets against their cutter carriers. Furthermore, one cutter lifter 37 with its coupled-on adjusting cylinder 39 is shown as mounted on the large housing cover 2. The above mentioned pressure lines 40 and 43 connect the adjusting cylinder 39 and also the one mounted on the rear housing wall, with the pump-distributing pipe member 62.

A cutter exchange is effected as follows: the cutting device is stopped, the lateral housing cover is opened, and the cutter ring is manually turned to a cutter exchange position and is locked against turning. The operator first depresses the switch 64 which in its turn in the distributing member 62 brings about the connection with the conduit 40. The pump unit itself was previously started.

The pressure which arrives at both sides of the cutting device pushes the adjusting cylinder piston 39 with the lifting cylinder piston 37 upwardly simultaneously with the abutment members 38. The abutment members 38 overcome the force of the dish springs 34 and move the pertaining pressure strip of the cutter carrying segment upwardly which occupies its cutter exchange position. The pressure strip thus frees the cutter packet which up to that time was pressed against the carrier segment. The operator removes the cutter packet and introduces a newly set packet while the latter will by itself occupy the proper position.

The operator then presses a second time upon the switch 64 whereby the pump pressure is now changed to the other line 43. The adjusting cylinder piston and the lifting cylinder piston (the latter with its abutment members) move back, and the dish spring packets again press with full force through the respective pressure switch the newly inserted cutter packet against the pertaining carrier segment.

Thereupon the operator locks the cutter ring in the next carrier segment position whereupon a new cutter packet exchange occurs. This operation is repeated until all cutter packets, have been exchanged. This total exchange takes only a short time.

It is, of course, to be understood that the present invention is, by no means, limited to the specific showing in the drawings but also comprises any modifications within the scope of the appended claims.

What is claimed is:

1. In a rotary cutting device; a housing, a pair of counterrotating cutter rings in concentric relation in said housing each comprising end members and circumferentially spaced axial elements extending between and connected to said end members, said elements on the radially outer ring comprising axial bar-like supports, a cutter packet on the radially outer side of each support, a clamping bar on the radially outer side of each packet, spring means urging each clamping bar into clamping pressure engagement with the radially outer side of each packet, and release means on the housing for engagement with said clamping bars to move the bars into packet releasing position to permit exchange of said packets.

2. A rotary cutting device according to claim 1 in which each support includes a surface on which the respective pocket is mounted, each said surface forming an angle of about 45° with the radius of the cutter ring which passes therethrough.

3. A rotary cutting device according to claim 1 in which the outer ring has end members and each clamping bar has end portions extending axially through the end members of the outer ring, said end members having slots receiving said end portions and said slots extending in the direction of movement of the respective clamping bar.

4. A rotary cutting device according to claim 3 which includes a spring housing on each end member of said outer ring for each clamping bar, springs enclosed in said housings, and means connecting the springs to the adjacent end of the clamping bar for biasing said clamping bars in clamping direction.

5. A rotary cutting device according to claim 1 in which each cutter packet comprises a cutter blade and a blade support plate, abutment means on the support plate for engagement with the respective support to locate the respective packet thereon, each plate having slot means formed therein for adjustment of the respective blade thereon, and a screw threaded into the blade and seated in said slot for adjustably clamping the blade to the plate.

6. A rotary cutting device according to claim 5 in which each blade has two longitudinally spaced threaded holes for receiving said screw to provide for adjustment of the blade on the plate beyond the limits provided by said slot means.

7. A rotary cutting device according to claim 1 in which said housing includes a section pivotally mounted thereon and moveable to expose a circumferential region of said outer ring for access to the said cutter packets thereon.

8. A rotary cutting device according to claim 1 in which the end members of said outer rings are provided with recesses adjacent each support to receive the respective cutter packet, the recesses being inclined at an angle of about 45° to a radius of the outer ring passing therethrough.

9. A rotary cutting device according to claim 1 in which said release means comprise lift members reciprocable on said housing, a motor for actuating each lift member, said lift members when actuated in one direction by the said motors engaging the adjacent clamping bars and moving the said bar into packet releasing position.

10. A rotary cutting device according to claim 9 which includes means for locking said outer ring in predetermined rotated positions for movement of said clamping bars individually into release position.

11. A rotary cutting device according to claim 9 in which each motor is on the outside of the respective end of the housing, each lift member extending axially through the respective end of the housing into the axial range of the ends of said clamping bars, the ends of said clamping bars protruding axially beyond the end members of said outer ring, each end member of the outer ring having slots receiving the ends of said clamping bars, said slots each being parallel to the direction of travel of said lift members in one rotated position of said outer ring.

12. A rotary cutting device according to claim 11 in which said housing has a slot for each lift member and each lift member has connected thereto a cover which slidingly encloses the respective slot.

13. A rotary cutting device according to claim 11 in which each motor in one end position moves the respective lifting member into position for engagement with the adjacent ends of the clamping bars and in the other end postion retracts the respective lift member inside the radial range of said clamping bars.

14. A rotary cutting device according to claim 1 which includes wear resistant rings between the end members of said rings to enclose the cutting region at the ends.

15. A rotary cutting device according to claim 11 in which each said motor is a reciprocating fluid motor, a pump, valve means connecting said pump in circuit with said motors, and switch means on the housing controlling said valve means.

* * * * *